Feb. 13, 1951     F. D. APPLEGATE     2,541,566
VIBRATION ISOLATION MOUNTING
Filed June 29, 1946     2 Sheets-Sheet 1
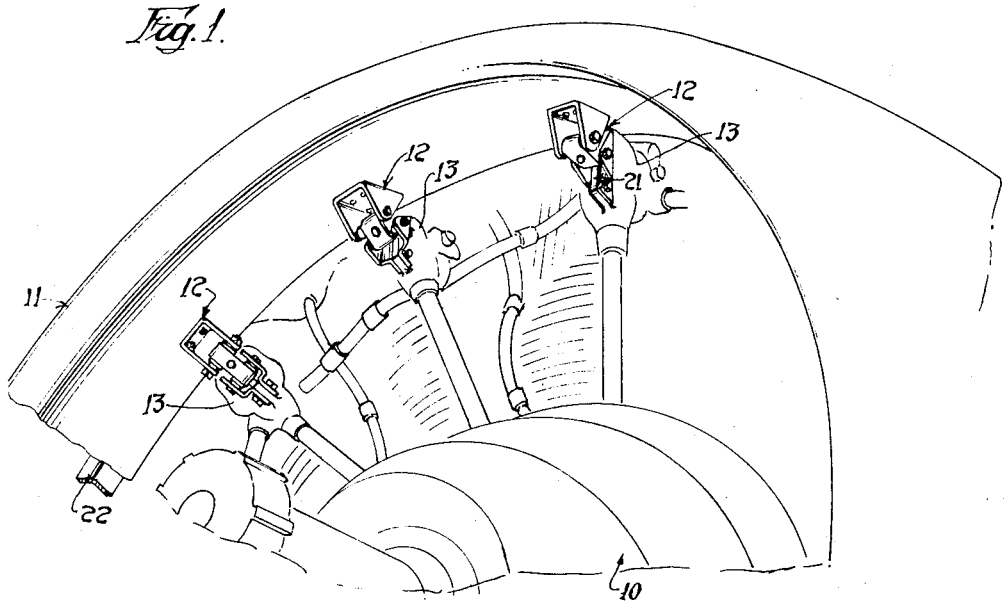
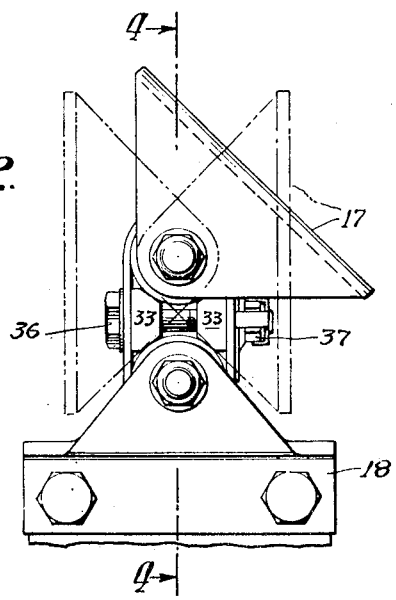
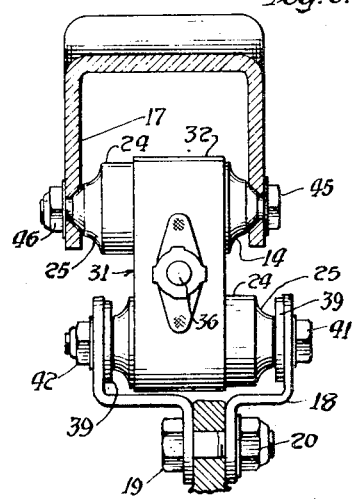
INVENTOR.
Fredrick D. Applegate,
BY Thomas P. Mahoney
Witness:
Enea A. Camporini

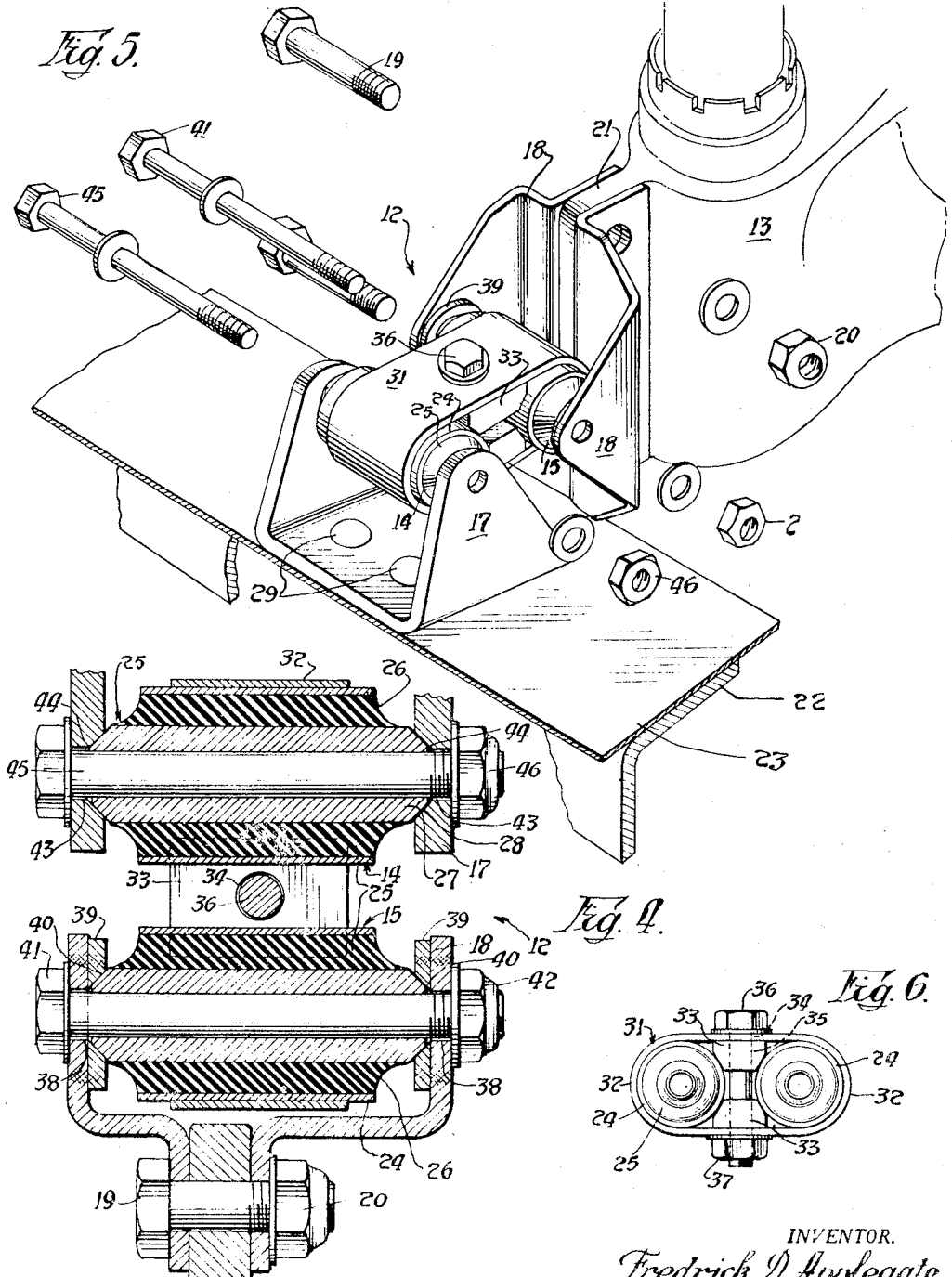

Patented Feb. 13, 1951

2,541,566

UNITED STATES PATENT OFFICE 2,541,566

VIBRATION ISOLATION MOUNTING

Fredrick D. Applegate, San Diego, Calif., assignor to Consolidated Vultee Aircraft Corporation, San Diego, Calif., a corporation of Delaware Application June 29, 1946, Serial No. 680,370

13 Claims. (Cl. 248—5)

This invention relates to improvements in vibration isolation mountings and more particularly to that type of mounting which includes resilient elements adapted to absorb the vibratory and thrust loads placed upon it.

Mountings such as the one which is the subject of the present invention have been utilized in the past for a variety of uses but have been applied particularly to the mounting of engines in aircraft or the cowlings about engines. For purposes of illustration, this invention will be described in connection with an aircraft engine and its associated cowling but it is, of course, conceivable that it could be utilized for a wide variety of applications in both aircraft and other allied fields.

The mounting of cowl rings about the periphery of radial engines has always been a source of considerable difficulty. The high thrust loads parallel to the torque axis of the engine, which are placed upon the ring as it is forced through the air and the vibratory loads placed upon the ring as the engine is translated on its mounts in a path tangential to its horizontal axis have been responsible for the high maintenance and replacement costs incident to the use of conventional types of mountings. Further, the thermal expansion of the engine in flight places additional loads upon the mounts which are added to the load factors mentioned above.

A large number of failures are caused or equipment replacements necessitated by the use of conventional vibration isolating mounts which, while designed to absorb the load factors in their resilient components, are so constructed that a large fraction of the load is transmitted as impact loads into the metallic components associated with the resilient components. For instance, conventional vibration isolation mounts which are in use today consist of assemblies in which a considerab'e amount of play is permitted initially or finally develops in the metal pins, bushings, or brackets with which the resilient components of the mountings are associated. Thus when loads are placed upon these mounts, instead of being absorbed by the resilient components, they are transmitted to the metallic elements which are quickly worn out by the abrasion and friction introduced by large thrust and impact loads and high vibrational frequencies. Naturally, since the resilient components of the mountings are not being permitted to directly absorb the induced loads under such conditions the structures associated therewith, such as the cowling and the mounting brackets of the engine, are frequently also adversely affected.

Another factor which is responsible for the high incidence of failures in cowl ring mountings is the occasional mislocation of the mounting brackets with which the mountings are associated. This mislocation is usua.ly not critical but is frequently of such an order that the vibration isolation mountings are placed under an initial and constant load factor when they are installed because no provision for the adjustment of the mounts is provided. Naturally, such conditions as these contribute to the premature fatigue of the mounts.

Further, when conventional vibration isolation mounts are worn out the entire assembly must be discarded since they are so designed that the salvage and reuse of the unworn components is practical.y impossible. It would be a considerable economy if the usable parts of the mounting could be utilized with replacements for the worn parts.

It is, therefore, an object of this invention to provide a vibration isolation mounting in which frictional wear in the metal components is eliminated by positively locking them together.

Another object of this invention is the provision of a vibration isolation mounting which is so designed and constructed that the loads borne by the mounting are absorbed as much as is possible, by the resilient components of the mounting.

Another object of this invention is the provision of a vibration isolation mounting which possesses an adjustable feature which will permit the disposition of the resilient components of the mounting in such a manner that the mounting may be effectively utilized in places where mislocation of the mounting brackets or attachments exists.

An additional object of this invention is the provision of a vibration isolation mounting which is so constructed and designed that the major components of which it is constructed are replaceable and interchangeable, thus permitting considerable savings to be made in the maintenance cost of the mounting.

A further object of this invention is the provision of a vibration isolation mounting which may be easily and economically assembled and taken apart to facilitate the replacement of worn components and to expedite its installation at the point of use.

Other objects and advantages of the invention will be made apparent by a consideration of the appended specification and the accompanying drawings, in which:

Figure 1 is a broken front elevational view of a radial aircraft engine with its associated cowl ring, with the cowl ring mounted on the engine by mountings constructed according to the present invention;

Figure 2 is a side elevational view of a vibration isolation mounting constructed according to the present invention showing the way in which the mounting brackets may be fastened at a wide variety of angles to the structure to be mounted;

Figure 3 is a top plan view showing the lateral displacement permitted by the adjustable construction of the mounting brackets;

Figure 4 is a vertical sectional view of the mount taken on line 4—4 of Figure 2;

Figure 5 is an exploded view of the component parts of the mount, and

Figure 6 is a side elevational view of the mount.

In the drawings (Fig. 1) there is shown a conventional aircraft assembly including a radial internal combustion engine 10 a cowl ring 11 and vibration isolation mountings 12, constructed in accordance with this invention, mounted on the valve rocker arm boxes 13 of the engine 10. The mountings 12 are adapted to mount the cowl ring 11 on the engine 10 to act as a damper on the thrust loads sustained by the cowl ring as the aircraft, with which it is associated, flies through the air and to reduce the amplitude and frequency of engine vibration transmitted into the cowl ring which is a sheet metal structure not designed to sustain severe loads and which when subjected to excessive vibration eventually fatigues and fails.

The vibration isolation mounting 12, as shown in Figures 4 and 5 comprises two resilient, vibration isolating members 14 and 15 which have respectively associated therewith two armed mounting brackets 17 and 18. Bracket 18 is formed of lighter gauge material than bracket 17 and is fixedly attached, as by means of bolts and nuts 19 and 20 to a mounting flange 21 formed integrally with the valve rocker arm box 13. The mounting bracket 17, formed of heavier gauge material than bracket 18, is fixedly attached as by rivets 29, to a former ring or circular structural member 22 which underlies the surface metal skin 23 of the cowl ring and which is utilized because the metal skin is not of sufficient strength to take the loads imposed by the bracket 17. There are cowl ring structures, however, where the bracket 17 can be mounted directly on the skin of the cowl ring because it is of sufficient strength to bear the loads imposed by the bracket 17.

The resilient vibration isolating members 14 and 15 consist of a cylindrical shell or casing 24 which surrounds a cylindrical block 25 formed of rubber or similar resilient material. The rubber block 25 has substantially frusto-conical ends 26 and embodies a bushing or sleeve 27 which runs through the rubber block 25 at its central horizontal axis. The ends 28 of the bushing or sleeve 27 are frusto-conical in shape and project beyond the frusto-conical ends 26 of the rubber block 25.

Since the resilient vibration isolating members 14 and 15 are designed to function cooperatively with each other there is provided a substantially elliptical strap member or sleeve 31 into the interior of which the resilient vibration isolating members are inserted. The arcs 32 at the ends of the sleeve 31 are so constructed that the contour of the metallic shell 24 will fit accurately therein. Positioned between the two resilient vibration isolating members 14 and 15 within the sleeve 31 is a pair of separator blocks or dividers 33 whose outline conforms generally, in the area in which it contacts the shells 24, to that of a truncated cone. A hole or orifice 34 is pierced or otherwise formed through both the upper and lower surfaces of the sleeve or strap member 31 at a point substantially on the center line of the sleeve 31. There are formed in the separator or divider blocks 33 holes or orifices 35 which are so situated that they will be adjacent to the holes 34 in the upper and lower surfaces of the sleeve or strap member 31. There is positioned in holes 34 and 35 a bolt 36 which has associated therewith a nut 37. The tightening of the nut 37 on the bolt 36 forces the truncated conical surfaces of the dividers 33 against the periphery of the shells 24 and by the wedging action of the truncated and conical surfaces the resilient vibration isolating members 14 and 15 are seated more firmly in the arcs 32 of the sleeve 31. Thus the possibility that the resilient vibration isolating members 14 and 15 might turn in the sleeve or strap member 31 when they are placed under load is eliminated and the resultant frictional wear which would result from such movement is prevented.

Formed in the sides of the mounting brackets 18 are oppositely positioned holes or orifices 38. Fixedly attached as by welding to the inner surfaces of the brackets 18 are washers 39 whose orifices 40 lie contiguous to the orifices 38 in the bracket 18. The walls of orifices 40 in washers 39 are so formed that they create a frusto-conical recess. Thus, the frusto-conical ends 28 of the bushing 27 are adapted to be received in the frusto-conical recesses formed by the frusto-conical holes or recesses 40 in the washers 39. Through oppositely positioned holes 38 in the brackets 18 and holes or concavities 40 in the washers 39 and the hollow interior of the bushing 27 is inserted a bolt or pin 41 which has associated therewith a nut or tightening means 42. Therefore when the nut 42 is tightened, the frusto-conical ends 28 of the bushing 27 are wedged tightly into the conical walled orifices 40 of the washers 39. In this way, the bushing 27 of the resilient vibration isolating member 15 is prevented from turning on the bolt or pin 41 and the concomitant incidence of frictional wear is eliminated.

Formed in the sides of mounting brackets 17 are oppositely disposed holes or orifices 43. As was indicated above the metal out of which bracket 17 is formed is substantially heavier than that out of which bracket 18 is formed. Therefore the positioning of washers similar to the washers 39 on the interior of brackets 17 is rendered unnecessary and frusto conical recesses 44 are formed adjacent the holes 43 on the interior surfaces of the bracket 18 in the metal of the bracket itself. In this manner the frusto-conical ends 28 of the bushing 27 register accurately with the walls of the frusto-conical depressions or recesses 44 in the brackets 17. A pin or bolt 45 is inserted through the holes 43 in the bracket 17 and through the interior of the bushing 27. Associated with one end of the pin or bolt 45 is a tightening means or nut 46 which, when tightened causes the frusto-conical ends 28 of the bushing 27 to be forced into the frusto-conical depressions or recesses 44 so that the resilient vibration member 14 is prevented from turning under load on the bushing 27 thus eliminating frictional wear on both the bushing 27 and the bolt 45.

By the provision of the dividers or separator blocks 33 within the sleeve or strap member 31 and the provsion of the frusto-conical ends 28 of the bushing 27 adapted to mate with frusto-conical recesses or depressions 40 in washers 39 carried by bracket 18 and conical recesses or depression 44 in the bracket 17, the turning of the resilient vibration isolating members 14 and 15 is prevented. A metal to metal lock is achieved and the frictional wear which would result from the movement of one metal surface upon the other, such as the shell 24 within the sleeve 31 or the bushing 27 upon the pin 41 is eliminated. Further, because all the metal parts are positively locked against movement the only possible components of the assembly which can move and thus absorb thrust and vibratory loads are the resilient blocks 25. Therefore, the vibration absorption and isolation power of the resilient blocks 25 is adapted to function much more efficiently than is the case in conventional mounts where a certain fraction of the thrust and vibratory loads are sustained by and exert a wearing effect upon the metal components of the mounting. Naturally, with the resilient components of the mounting operating at peak efficiency and no wear to be sustained by the metal components, the life of the mounting is considerably prolonged with attendant economies in maintenance and overhaul costs.

Since the vibration isolation mountings 12 are intended for use in a wide variety of applications, it is, of course, conceivable that the two part mounting brackets 17 and 18 can have their mounting flanges altered to fit the particular installation in which the vibration isolation mountings will be used. However, concavities or depressions similar in design and construction to concavities or depressions 40 and 44 will always be formed in the interior of the extending arms of the mounting brackets, no matter what the design of the brackets, so that the metal to metal lock on the frusto-conical ends 28 of the bushings 27 may be achieved.

The mounting brackets may be positioned at a wide variety of angles to each other just as mounting bracket 18 is located practically at right angles to the mounting bracket 17 in the particular installation shown in Figure 2 by making two adjustments. First, the pin or bolt 41 is released by untightening the locking means or nut 42. Thus, the metal to metal lock of the frusto-conical ends 28 of the bushings 27 in the concavities or depressions 40 will be released. Then the bolt 36 which runs through the sleeve 31 is released by untightening the nut 37, permitting the pressure on the separators or dividers 33 to be released and the tension on the sleeve 31 to be eased. In this manner, the locking action of the arcs 32 of the sleeve 31 upon the periphery of the shells 24 is diminished and the resilient vibration isolating member 15 is free to turn within the bracket 18 or the bracket 18 is free to turn upon the pin or bolt 41 to permit the mounting bracket 18 to be positioned at that angle to the mounting bracket 17 which appears to be most desirable for the purposes of the installation. The accurate alignment of the mounting brackets with the surfaces between which the vibration isolation mountings are to be used, which is permitted by the unique construction of this invention, is a valuable factor in eliminating the preloading which frequently occurs when conventional types of vibration isolation mountings are installed and are forced to fit the installation rather than adjusted to it.

Frequently in the installation of cowl rings on the engine, it is discovered that the holes on which the mounting bracket for the cowl ring was to be positioned have been mislocated. With conventional vibration isolation mountings it is necessary to redrill the holes, if they are seriously mislocated or to force the vibration isolation mounting into position in such a way that the distortion of the mounts will permit the bracket to be affixed to the mislocated holes. The redrilling of holes in the first instance is a costly and time-consuming procedure and the pre-loading of the mounting caused by forcing it into position in the mounting brackets when the holes are only slightly mislocated initiates a fatigue cycle in the mounts which contributes to their eventual and premature failure. In vibration isolation mountings constructed in accordance with the present invention, provision is made for the lateral adjustment of the resilient vibration isolating elements within the sleeve 31 so that the mounting brackets 17 and 18 associated with the resilient vibration isolating elements 14 and 15, may be shifted laterally in order to compensate for the mislocation of the mounting brackets 17 and 18. As shown in Figure 3 resilient vibration isolating member 14 has been shifted to the left within sleeve 31 to permit mounting bracket 17 to be affixed to the cowl ring by means of mislocated holes and resilient vibration isolating member 15 has been shifted to the right within the sleeve 31 to permit the bracket 18 to be mounted on the mounting flange 21 of the valve rocker arm box 13 which, in this case, is not in accurate alignment with the vibration isolation mounting 12.

The lateral adjustment of the resilient vibration isolating elements 14 and 15 within the sleeve 31 is achieved by loosening the bolt 36 so that the pressure of the wedge 33 which forces the exterior shells 24 of the resilient vibration isolating elements into the arcs 32 formed by the ends of the sleeve 31 is released. The resilient vibration isolating elements 14 and 15 are then free to be shifted laterally within the sleeve 31. Thus, considerable expenditure and trouble may be avoided in such cases of mislocation. In addition, it is feasible to use the lateral adjustability of the mounting deliberately when the mislocation of the mounting brackets would be desirable for a specific application of the vibration isolation mounts.

Since the cost of replacing conventional mountings, which are so constructed that the elements they embody are not replaceable or interchangeable has been a dominant factor in the overall high cost entailed by their use, the provision of a mounting constructed in accordance with this invention should lead to worthwhile economies. The construction of the vibration isolation mounting which is the subject of this invention is such that all of the major components of the assembled mounting are interchangeable so that worn components can be replaced with ease, thus eliminating the necessity for discarding the entire mounting as is the custom with conventional mountings.

For instance, should the resilient vibration isolating element 15 wear out, the withdrawal of the bolt or pin 41 from the interior of the bushing 27 and the loosening of the bolt 36 which runs through the sleeve 31 and the separator or divide blocks 33 will permit the sleeve 31 to be swung up or down out of its position within the arms of the bracket 18, which can be spread apart upon the withdrawal of the bolt or pin 41 to permit the frusto-conical ends 28 of the bushing 27 to be displaced from their seats in the concavities 49. The resilient vibration isolating element 15 can then be withdrawn from its position within the sleeve 31 and a replacement part inserted with no difficulty whatsoever. Thus, the unworn components of the assembly need not be discarded because of the failure of one of the elements. Of course any one of the component parts of the assembly can be replaced with equal facility when the need arises.

The greatest loads imposed upon the cowl ring 11 as the plane flies through the air are direct thrust loads which lie in a plane parallel to the torque axis of the engine 10. Under such loads, the force components are carried from the cowl ring 11 through the mounting bracket 17, from the arms of the mounting bracket 17 into the bushing 27. Since both bushing 27 and bracket 17 are not movable in relation to each other, the direct thrust is transferred into a component which works through the resilient block 25 and there is no metal to metal movement. Whatever force is not absorbed in the block 25 of resilient element 14 is transferred into the shell 24 which because it is gripped immovably in the arcs 32 of the sleeve 31 by the wedging action of separators 33, transmits the forces through the sleeve 31 into shell 24 of member 15 and thence into the resilient blocks 25. There is no movement of the metal parts against each other since they act merely to transmit the forces imposed upon the cowling 10 into the resilient blocks 25.

Torsional vibrations of the engine 10 on its mounts perpendicular to the axis of thrust of the engine 10 are communicated to the vibration isolation mountings from the valve rocker arm boxes 13. These vibratory movements act in shear upon the vibration isolation mountings and the bracket 18 is laterally displaced in relation to the bracket 17. Since there can be no movement of metal components one against the other, the lateral or shear loads are absorbed by the resilient block 25 embraced in the bracket 18. From the block 25 the movement is transmitted into the shell 24 through the sleeve 31 and the rubber block 25 is embraced by the arms of bracket 17. From the bracket 17 whatever slight movement remains is transmitted into the cowl ring 11. When the engine 10 vibrates on a line parallel to its thrust axis the loads placed upon the vibration isolation mountings are absorbed in a manner similar to that in which the thrust loads upon the cowling are absorbed.

The expansion of the engine 10 due to the heat generated in flight causes the vibration isolation mountings 12 to be actuated in such a manner that the engine displacement is converted into torsional movements of the resilient vibration isolating elements 14 and 15. This movement is carried from the bracket 18 into the resilient vibration isolating element 15. The resilient block 25 is immediately torqued in a clock-wise direction. Whatever movement is not absorbed is carried through the shell 24 through the sleeve 31 into the shell 24 of resilient vibration isolating element 14 and thence into resilient block 25 which is torqued in a counter-clockwise direction.

It is apparent from the above description of the operational sequence of the mountings that there is never any movement of metal against metal and that all vibratory loads are absorbed in the resilient blocks embodied in the mounts.

There is thus provided through this invention a vibration isolation mounting which is so constructed that there will be no frictional wear in the metal components since they are locked one against the other so that all loads may be transmitted through them into the resilient blocks embodied in the mountings. In addition, the mounting is so constructed and designed that the replacement of worn or fatigued components may be readily accomplished. Further, the mounting possesses an adjustable feature which permits its satisfactory installation in positions where other mountings could not be utilized.

It is, of course, understood that the embodiments of the invention discussed above have been utilized for purposes of illustration and example only and it is obvious that changes may be made in this construction which would still fall within the scope of the appended claims.

I claim:

1. A vibration isolation mounting for a mounted member comprising bracket means affixed to the mounted member, bracket means affixed to the mounting member, a cylindrical vibration isolating element positioned within said bracket affixed to said mounting member, a cylindrical vibration isolating element positioned within said bracket affixed to said mounted member, a sleeve having opposite ends positioned within said brackets, means for releasably mounting said cylindrical vibration isolating elements within the opposite ends of said sleeve and securing them against lateral and rotary movement therein, and means for positively securing said cylindrical vibration isolating elements against rotary movement relative to said brackets.

2. A vibration isolation mounting for a mounted member which is spaced apart from the member on which it is mounted, comprising bracket means affixed to said mounted member, bracket means affixed to the mounting member, a resilient vibration isolating element positioned within said bracket affixed to said mounted member, a resilient vibration isolating element positioned within said bracket affixed to said mounting member, said resilient vibration isolating elements having bushing means running through their centers on their horizontal axes, a sleeve having opposite ends positioned within said brackets, means for releasably mounting said resilient vibration isolating elements within the opposite ends of said sleeve and securing them against lateral and rotary movement therein and means for positively securing the opposite ends of said bushing means against rotary movement within said brackets.

3. A device of the character described including bracket means affixed to a mounted member, bracket means affixed to a mounting member, a cylindrical resilient vibration isolating element positioned within said bracket means affixed to said mounted member, a cylindrical resilient vibration isolating element positioned within said bracket means affixed to said mounting member, said cylindrical resilient vibration isolating elements including cylindrical blocks of resilient material, shell means positioned about and firmly bonded to the periphery of said cylindrical blocks, bushing means running through the centers of said cylindrical blocks on their horizontal axes being firmly bonded in the centers of said cylindrical blocks, sleeve means having opposite ends positioned within said brackets, means for releasably mounting said cylindrical vibration isolating elements within the opposite ends of said sleeve, said means for mounting being constructed and arranged to coact with said shell means to prevent the lateral and rotary displacement of said cylindrical resilient vibration isolating elements relative to said sleeve, and means to positively secure the opposite ends of said bushing means against rotary movements within said brackets.

4. A device of the character described including a multi-armed bracket means affixed to a mounted member, a multi-armed bracket means affixed to a mounting member, the arms of each of said brackets having oppositely disposed orifices therein, resilient vibration isolating elements positioned within said bracket means adjacent said orifices, bushing means running through the centers of said resilient vibration isolating elements on their horizontal axes and arranged in coaxial alignment with said oppositely disposed orifices, sleeve means having its ends positioned within said brackets, said resilient vibration isolating elements being located within the opposite ends of said sleeve means and positively secured against rotary and lateral movement therein, and the opposite ends of said bushings being secured to prevent the rotary displacement of said resilient vibration isolating elements relative to said brackets, with the opposite ends of one said bushings being fitted and retained within the orifices with which said bushing is aligned.

5. A device of the character described including multi-armed bracket means affixed to a mounted member, multi-armed bracket means affixed to a mounting member, the arms of each of said brackets having oppositely disposed orifices therein, said orifices in the arms of one of said brackets being enlarged by depressions on the inner sides of said arms, an apertured means positioned on the inner side of each of the arms of the other of said brackets adjacent the orifices therein, resilient vibration isolating elements positioned within said bracket means adjacent said depressions, bushing means running through the centers of said resilient vibration isolating elements on their horizontal axes, one of said bushing means having oppositely disposed ends adapted to be seated within said depressions on the inner sides of the arms of said one bracket the other of said bushing means having oppositely disposed ends adapted to be seated within said apertured means, sleeve means having its ends positioned within said bracket means, said resilient vibration isolating elements being located within said sleeve means and positively secured therein and means for positively securing the opposite ends of said bushing means in said depressions and apertured means.

6. A device of the character described including multi-armed bracket means affixed to a mounted member, multi-armed bracket means affixed to a mounting member, the arms of each of said brackets having oppositely disposed orifices therein, said orifices in the arms of one of said brackets leading to concavities on the inner side of said arms, means having concavities positioned adjacent the oppositely disposed orifices of the arms of the other of said brackets, resilient vibration isolating elements positioned within said bracket means adjacent said concavities, bushing means running through the center of said resilient vibration isolating means on their horizontal axes, said bushing means having oppositely disposed frusto-conical ends adapted to be seated in said concavities, sleeve means having its ends positioned within said bracket means, said resilient vibration isolating elements being located within said sleeve means and positively secured therein to prevent rotary and lateral displacement of said resilient vibration isolating elements and the frusto-conical ends of said bushing means being firmly seated in said concavities to prevent the rotary displacement of said resilient vibration isolating elements within said brackets.

7. A vibration isolation mounting for a mounted member comprising bracket means affixed to the mounted member, bracket means affixed to the mounting member, resilient vibration isolating elements positioned within each of said bracket members, sleeve means having opposite ends positioned within said bracket means, said resilient vibration isolating elements being located within said sleeve means, readily releasable separator or divider means located within said sleeve for removably mounting said resilient vibration isolating elements in said sleeve and adapted to force them into contact with the interior walls of said sleeve to positively secure them against lateral or rotary displacement therein and the opposite ends of said resilient vibration isolating elements being fixed in said brackets to preclude the possibility of rotary displacement therein.

8. A vibration isolation mounting for a mounted member, comprising bracket means affixed to the mounted member, bracket means affixed to the mounting member, resilient vibration isolating elements positioned within each of said bracket means, sleeve means having opposite ends positioned within said bracket means, said resilient vibration isolating elements being located within said sleeve means, substantially wedge-shaped separator or divider means located within said sleeve adapted to force said resilient vibration isolating elements into contact with the interior walls of said sleeve to positively secure them against lateral and rotary displacement therein and the opposite ends of said resilient vibration isolating elements being fixed in said brackets to preclude the possibility of rotary displacement therein.

9. A vibration isolation mounting for a mounted member, comprising bracket means affixed to the mounted member, bracket means affixed to the mounting member, resilient vibration isolating elements positioned within each of said bracket means, sleeve means having opposite ends positioned within said bracket means, said resilient vibration isolating elements being located within said sleeve means, substantially wedge-shaped separator or divider means located within said sleeve and having a portion of their surface in direct contact with the periphery of said resilient vibration isolating means, pin or bolts means running through orifices in said sleeve and said divider means adapted when tightened to force said divider means against said resilient vibration isolating means to press said resilient vibration isolating means against the interior of said sleeve thus precluding the possibility of said resilient vibration isolating elements being displaced therein.

10. A mounting adapted to isolate the movement of a mounted member upon its mounting member including bracket means affixed to said mounted member, bracket means affixed to said mounting member, resilient vibration isolating elements positioned within each of said bracket means, bushing means running through the center of said resilient vibration isolating elements on their horizontal axes, bolt or pin means passing through said bushing means and said bracket means adapted to hold said resilient vibration isolating elements within said bracket means, sleeve means having opposite ends positioned within said bracket means, said resilient vibration isolating elements being located within said sleeve means and firmly fixed therein against lateral or rotary displacement.

11. A mounting adapted to isolate the movement of a mounted member upon its mounting member including bracket means affixed to said mounted member, bracket means affixed to said mounting member, resilient vibration isolating elements positioned within each of said bracket members, bushing means running through the center of said resilient vibration isolating elements on their horizontal axes, sleeve means having opposite ends positioned within said bracket means, said resilient vibration isolating elements being located within said sleeve means, separator or divider means located within said sleeve means adapted to force said resilient vibration isolating elements into contact with the interior walls of said sleeve to positively secure them against lateral or rotary displacement therein and the opposite ends of said resilient vibration isolating elements being fixed in said brackets to preclude the possibility of rotary displacement therein.

12. A mounting adapted to isolate the movement of a mounted member upon its mounting member comprising multi-armed bracket means affixed to said mounted member, multi-armed bracket means affixed to said mounting member, the arms of each of said brackets having oppositely disposed orifices therein, resilient vibration isolating elements positioned within said bracket means adjacent said orifices, bushing means running through the center of said resilient vibration isolating elements on their horizontal axes and arranged in coaxial alignment with said oppositely disposed orifices, sleeve means having its ends positioned within said brackets, said resilient vibration isolating elements being located within said sleeve means, separator or divider means located within said sleeve means adapted to force said resilient vibration isolating elements into contact with the interior walls of said sleeve to positively secure them against lateral and rotary displacement therein and the opposite ends of said bushings being secured to prevent the rotary displacement of said resilient vibration isolating elements relative to said brackets, with the opposite ends of one of said bushings being fitted and retained within orifices with which said bushing is aligned.

13. A mounting adapted to isolate the movement of a mounted member upon its mounting member comprising multi-armed bracket means affixed to said mounted member, multi-armed bracket means affixed to said mounting member, the arms of each of said brackets having oppositely disposed orifices therein, said orifices in the arms of one of said brackets being subtended by concavities on the inner side of said arms, means having concavities positioned adjacent the orifices in the arms of the other of said brackets resilient vibration isolating elements positioned within said bracket means adjacent said concavities, bushing means running through the center of said resilient vibration isolating means on their horizontal axes, said bushing means having frusto-conical ends adapted to be seated in said concavities, sleeve means having its ends positioned within said brackets, said resilient vibration isolating elements being located within said sleeve means, separator or divider means located within said sleeve means adapted to force said resilient vibration isolating elements into contact with the interior walls of said sleeve to positively secure them against lateral and rotary displacement therein, said frusto-conical ends of said bushing means being firmly seated in said concavities to prevent the rotary displacement of said resilient vibration isolating elements within said brackets.

FREDRICK D. APPLEGATE.

REFERENCES CITED

The following references are of record in the file of this patent:

UNITED STATES PATENTS

| Number | Name | Date |
|---|---|---|
| 2,121,429 | Gluhareff | June 21, 1936 |
| 2,175,825 | Browne et al. | Oct. 10, 1938 |